Aug. 27, 1940.   L. L. OGG   2,213,146
PHOTOGRAPHER'S WORK CABINET
Filed May 17, 1939   5 Sheets—Sheet 3
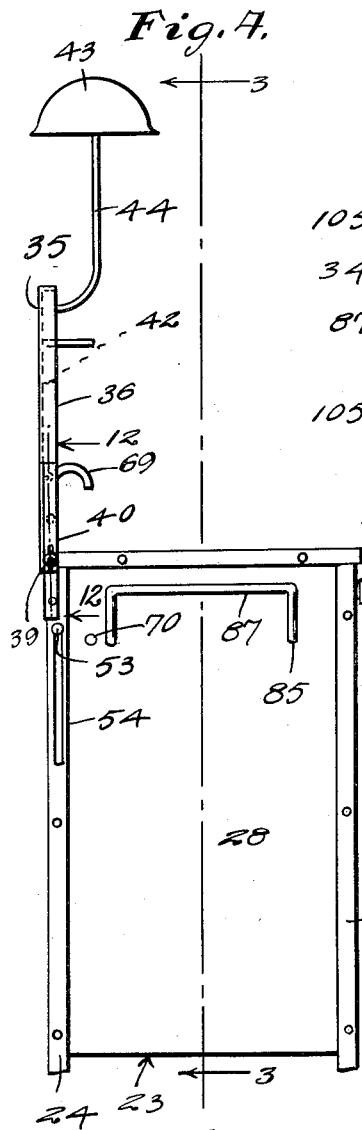
Fig. 4.
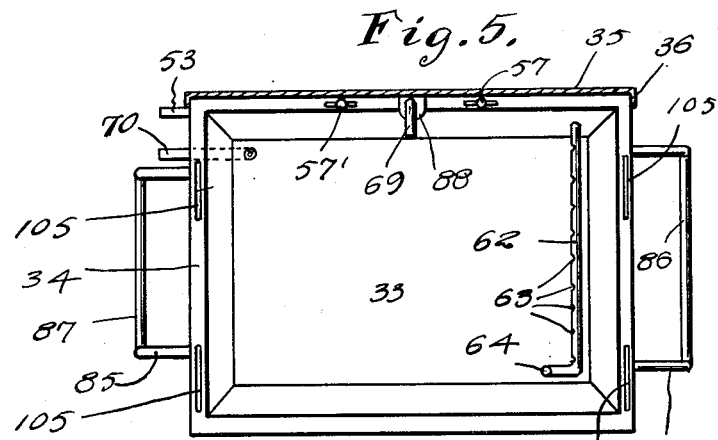
Fig. 5.
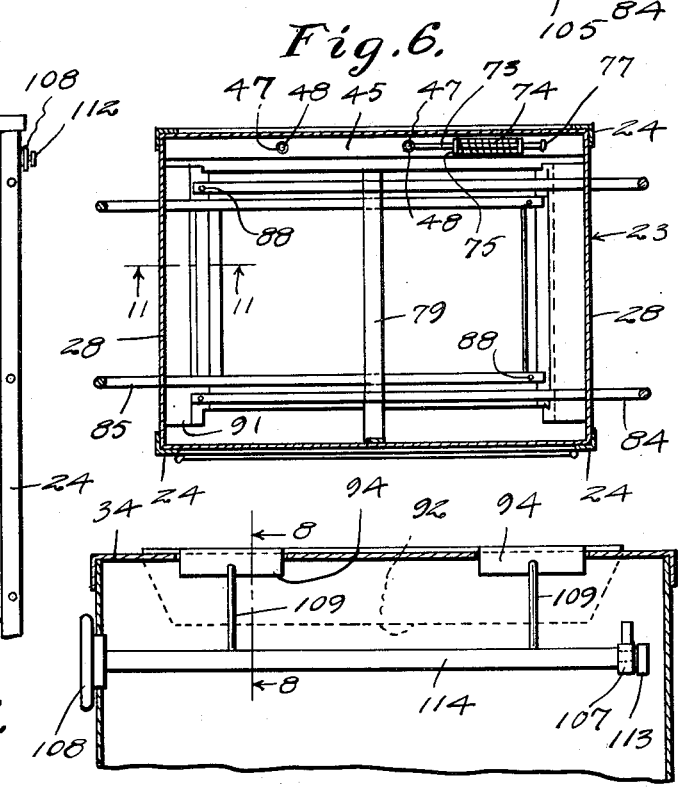
Fig. 6.
Fig. 7.
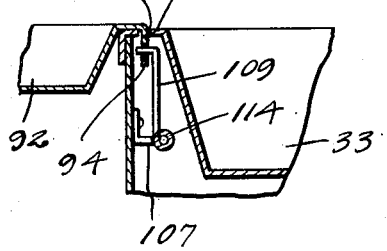
Fig. 8.
Inventor
Leon L. Ogg
By L. F. Faudrest
Attorney Aug. 27, 1940.　　　　　L. L. OGG　　　　　2,213,146
PHOTOGRAPHER'S WORK CABINET
Filed May 17, 1939　　　5 Sheets-Sheet 4
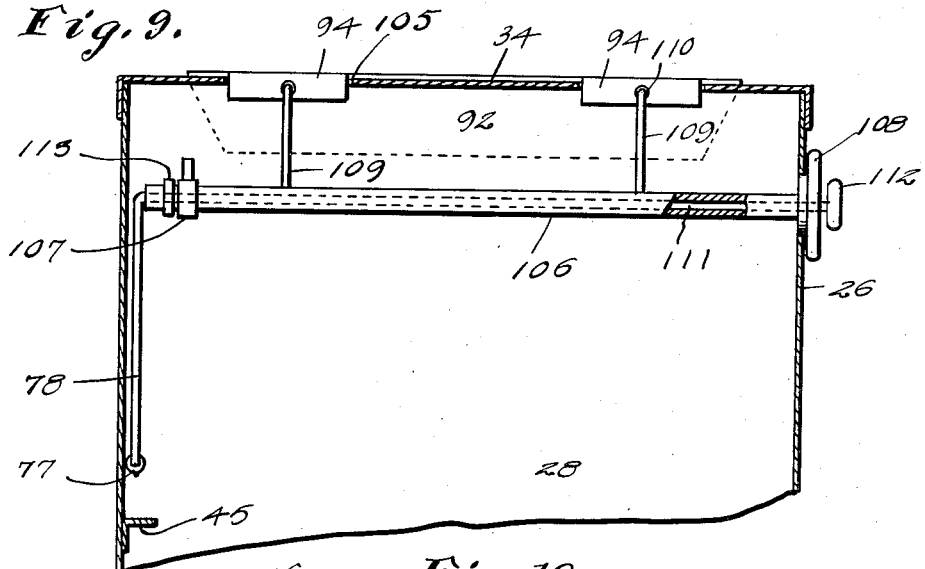
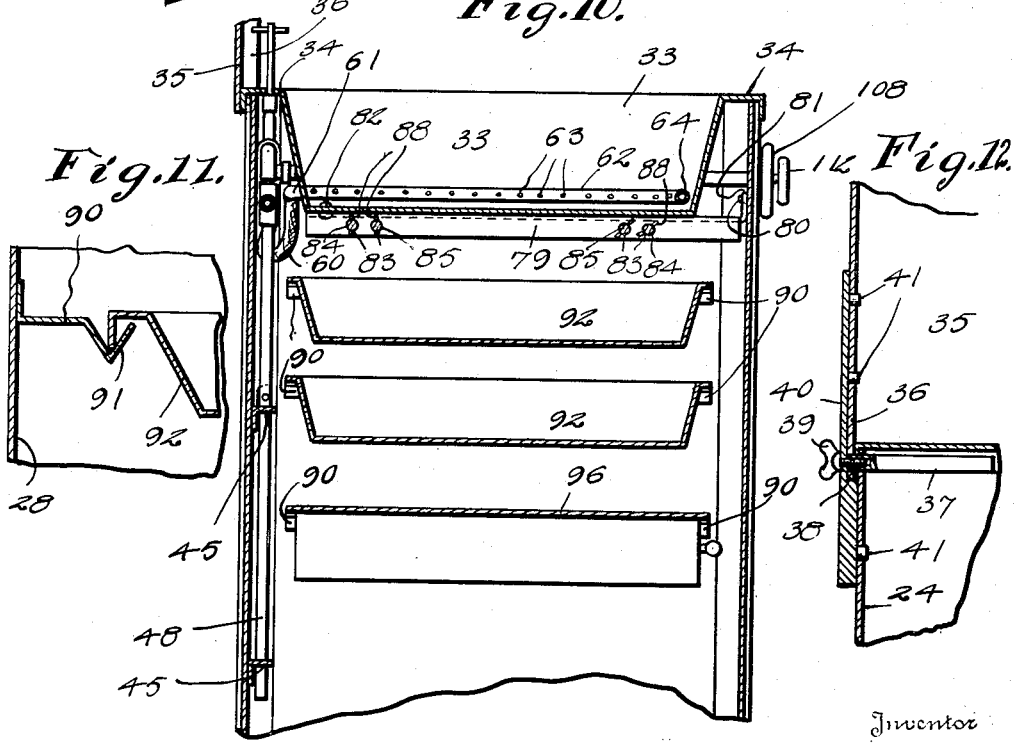
Inventor
Leon L. Ogg
By L. F. Randolph
Attorney Aug. 27, 1940. L. L. OGG 2,213,146
PHOTOGRAPHER'S WORK CABINET
Filed May 17, 1939 5 Sheets-Sheet 5
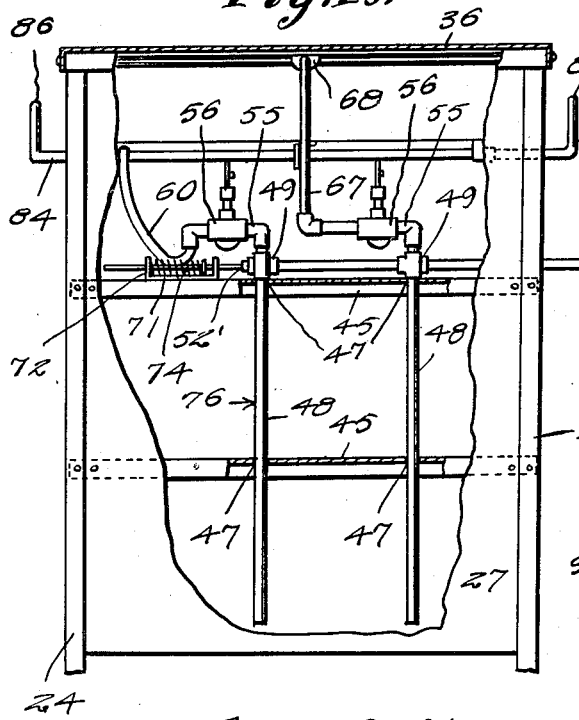
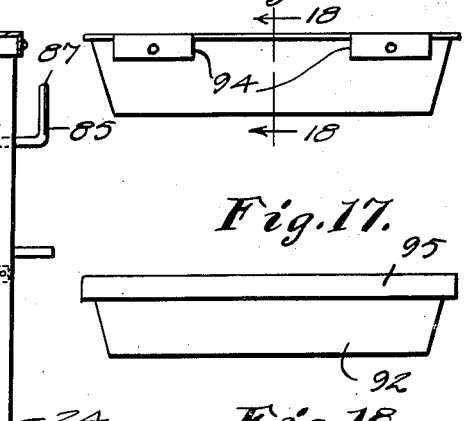
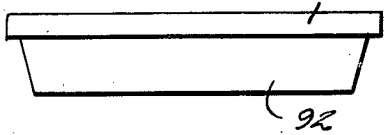
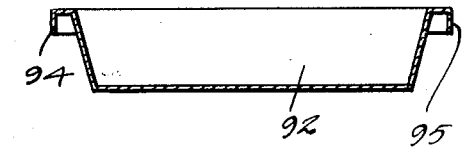
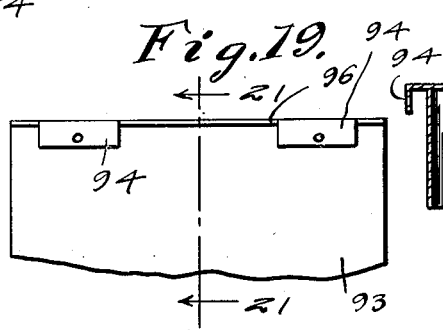
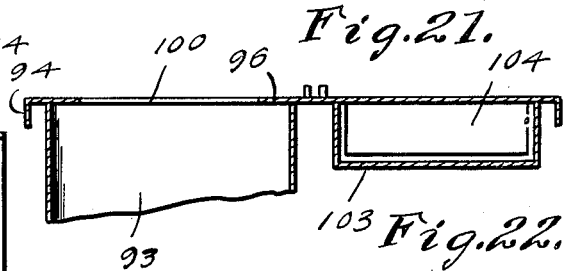
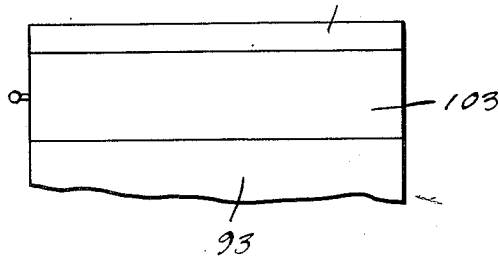
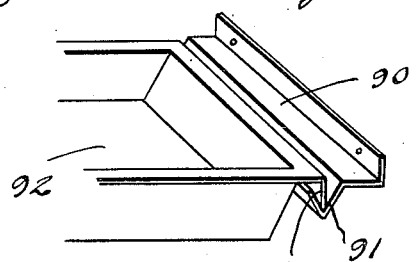
Inventor
Leon L. Ogg
By L. F. Kaudreth
Attorney Patented Aug. 27, 1940

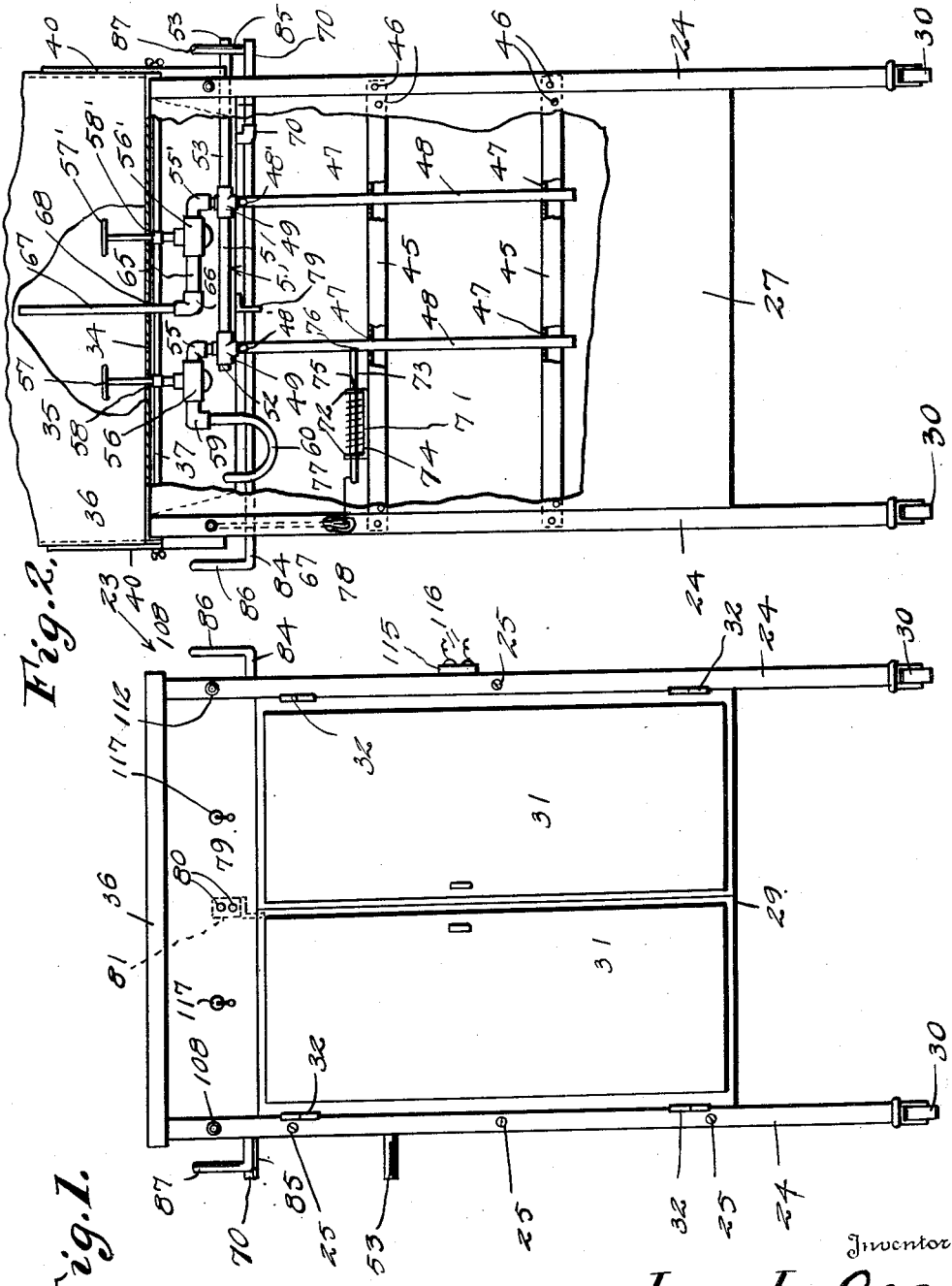

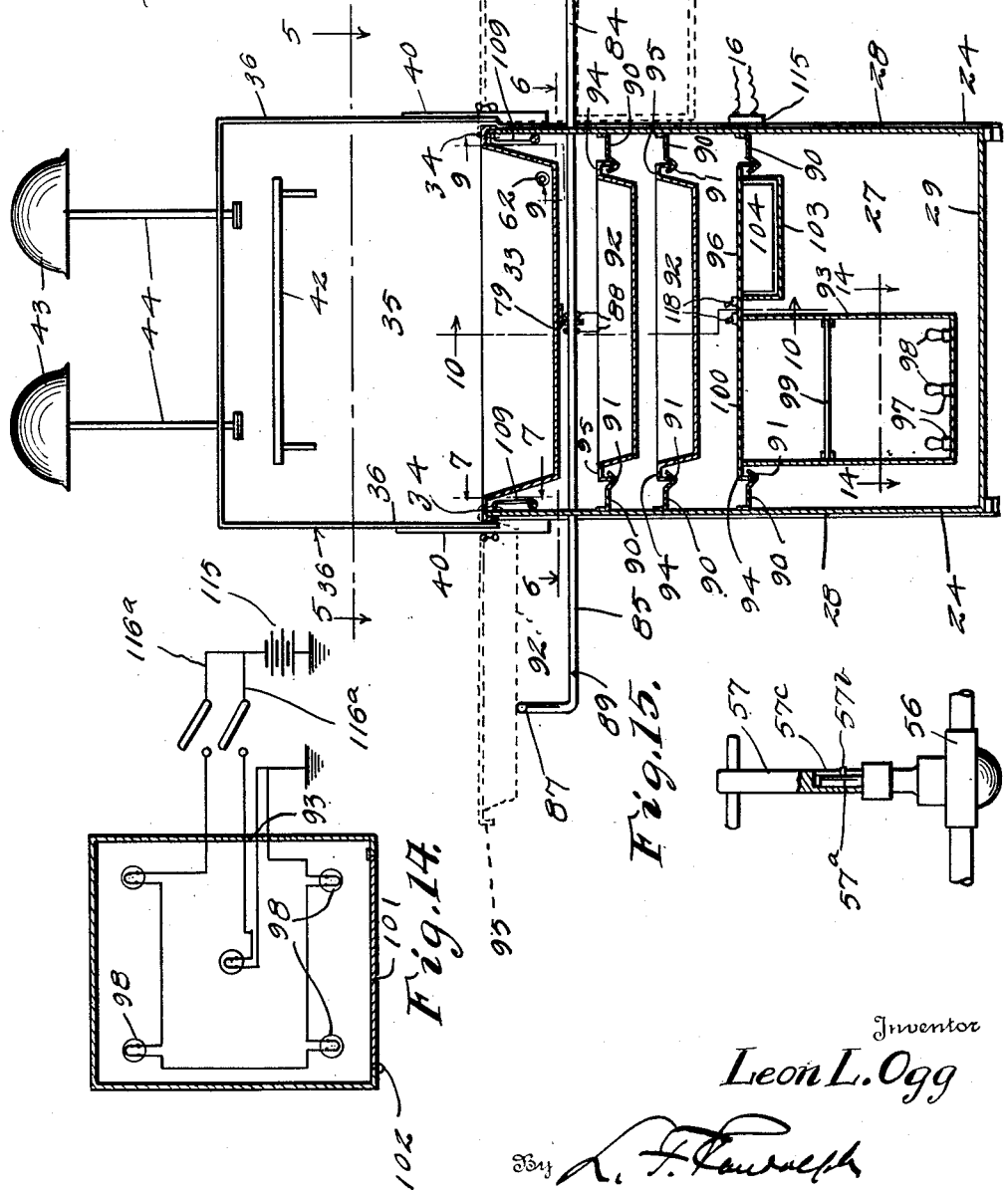

2,213,146

UNITED STATES PATENT OFFICE 2,213,146

PHOTOGRAPHER'S WORK CABINET

Leon L. Ogg, Creston, Iowa

Application May 17, 1939, Serial No. 274,279

15 Claims. (Cl. 312—169)

The invention relates to an improved cabinet for use in photofinishing work.

It is a primary aim of this invention to provide a photographer's cabinet of simple compact construction, mounted on wheels for ready mobility, and provided with a system of retractible pipes for supplying and draining water to and from, respectively, a sink forming a part of the cabinet.

Still a further aim of the invention is to provide a compartment in the bottom of the cabinet adapted to contain a plurality of slidably mounted trays and a printing box each of which is capable of being readily removed and mounted on the ends of the top of the sink.

Still another object of the invention is to provide improved retractible supporting means for supporting the outer ends of the trays and printing box when connected to the sink; and improved means for connecting and locking the trays and printing box to the flanged ends of the sink.

Still another object of the invention is to provide a pivotally mounted cover adapted to rest flush on the sink when the cabinet is in a closed position and to form a back splashboard for the sink when in an open position.

Other objects and advantages of the invention will hereinafter become more fully apparent from the following description of the drawings, which illustrate a preferred embodiment thereof, and wherein:

Figure 1 is a front elevational view showing the cabinet in a closed position,

Figure 2 is a fragmentary rear elevational view, partly broken away and partly in section of the same, Figure 3 is a vertical sectional view taken along the line 3—3 of Figure 4, Figure 4 is a fragmentary side elevational view showing the cabinet in an open position, Figure 5 is a horizontal sectional view taken along the line 5—5 of Figure 3, Figure 6 is a horizontal sectional view taken along the line 6—6 of Figure 3, and showing the supporting frame in a retracted position, Figure 7 is a vertical sectional view, on an enlarged scale, taken along the line 7—7 of Figure 3, Figure 8 is a vertical sectional view taken along the line 8—8 of Figure 7, Figure 9 is an enlarged vertical sectional view taken along the line 9—9 of Figure 3, Figure 10 is a transverse vertical sectional view taken along the line 10—10 of Figure 3, Figure 11 is an enlarged vertical sectional view taken along the line 11—11 of Figure 6, Figure 12 is an enlarged vertical sectional view taken along the line 12—12 of Figure 4, Figure 13 is a rear elevational view showing the cabinet in a closed position and with the back wall broken away to show the pipe system retracted, Figure 14 is an enlarged horizontal sectional view taken along the line 14—14 of Figure 3, and including a diagrammatic showing of an electric circuit, Figure 15 is an enlarged side elevational view, partly in section of one of the valve operating handles of the pipe system, Figure 16 is an end view in elevation of one of the trays, Figure 17 is a side elevational view of the same, Figure 18 is a longitudinal vertical sectional view taken along the line 18—18 of Figure 16, Figure 19 is a fragmentary elevational view of the end of the printing box corresponding to the end of the tray seen in Figure 16, Figure 20 is a fragmentary end view of the opposite end of the printing box, Figure 21 is a longitudinal vertical sectional view taken along the line 21—21 of Figure 19, and Figure 22 is a fragmentary perspective view showing one end of one of the trays mounted in one of the V-type rails.

Referring more particularly to the drawings, wherein like reference characters designate like or corresponding parts throughout the different views, 23 designates generally the photographer's work cabinet which comprises the four corresponding corner members 24, formed of angle iron and having their upper portions connected by plates, secured by the fastenings 25 to form the front wall 26, rear wall 27, side walls 28, and bottom 29. The depending ends of the members 24 form supporting legs for mounting the cabinet 23 in an elevated position and are provided with the casters 30 to facilitate movement thereof. The front wall 26 is provided with a pair of doors 31 hinged at 32 to swing outwardly. A sink 33, as best seen in Figure 5, has its rim provided with an outwardly projecting flange 34 which is adapted to rest on the upper edges of the walls 26, 27 and 28 to form the top of the cabinet 23, when in an open position, as seen in Figure 4.

A lid 35 having the side flanges 36, is connected to the back edge of the upper end of the cabinet 23 by a rod 37 which extends longitudinally thereof through the two back corner members 24.

The ends of the rod 37 extend into and are keyed to the side flanges 36 of the lid 35 and are rotatably mounted in the corner members 24 to pivotally mount lid 35 relatively to the cabinet 23 so that said lid may be folded downwardly to cover the open top of the sink 33, as seen in Figure 1.

Referring particularly to Figure 12, one end of the rod 37 is shown projecting through one of the members 24 and into an opening in one of the side flanges 36 of the lid 35. Rod 37 is circular in cross section except for its ends, which engage the flanges 36 which are polygonal shaped, and is provided with the threaded bore 38 in each end thereof to receive the thumb screws 39 which mount the bars 40 provided with the lugs 41 to engage openings in the members 24 and the flanges 36 for retaining the lid 35 in a vertical or raised position. The lower ends of the bars 40 are enlarged to fit flush against the members 24 beneath the flanges 36, as seen in Figure 12.

Lid 35 is provided with a shelf 42, adjacent its top which projects from the inner side thereof and which folds into the sink 33 when the lid 35 is closed. A pair of electric light fixtures 43 are provided with flexible standards 44 which are secured to the inner side of the lid 35, above the shelf 42 and which are adapted to be bent to position the fixtures 43 in the sink 33, not shown, when the lid 35 is closed.

Referring particularly to Figures 2 and 10, a pair of angle iron members 45 are connected at their ends by the fastenings 46 to the back corner members 24 and are disposed in spaced apart relationship one above the other in the cabinet 23. The horizontal portions of the members 45 are provided with the alined openings 47 to slidably mount the pipe sections 48 which connect at their upper ends with the corresponding coupling members 49, which form a part of the pipe line 50. Pipes 48 are plugged, adjacent their upper ends, as indicated at 48' to seal the lower outlets of the coupling members 49, which are of the X-type, having four open ends each. A pipe 51 has one end mounted in one of the coupling members, with its opposite end mounted in the other coupling member 49. The first mentioned coupling member 49 is provided with a plug 52 for sealing the end opposite to the end in which the pipe 51 is connected, while a pipe 53 is mounted in the second coupling member 49 in line with the pipe 51 and has its free end projecting outwardly through the slot 54, in one of the corner members 24, as best seen in Figure 4. An elbow shaped pipe section 55 is connected to the upper open end of the first mention coupling 49 and to a conventional valve body 56 which is provided with the valve stem and handle 57 which projects upwardly therefrom through an opening 58 in flange 34 of sink 33. A coupling member 59 is connected to the opposite end of the valve body 56 and a hose 60 is connected at one end to the free end of the coupling member 59. The opposite end of the hose 60 is connected to the open end 61 of a manifold pipe 62, which projects outwardly through the back side of sink 33. As best seen in Figure 5, the manifold pipe 62 extends along the bottom of the sink 33, adjacent one end thereof, and is provided with a plurality of apertures 63 in one side thereof which face toward the opposite end of the sink 33 for supplying a plurality of jets of water to the sink 33 which are directed longitudinally along its bottom. The opposite end 64 of the pipe 62 is provided with a closure plug. A corresponding valve body 56' is connected at one end to the other coupling 49 by a pipe section 55', and is provided with a valve stem and handle 57' which extends through an opening 58' in the flange 34. A pipe section 65 connects the opposite end of the valve body 56' to an elbow joint 66 which is connected to one end of the spout 67 which extends upwardly through the recessed portion 68 in the flange 34 and sink 33, and which is disposed between the openings 58 and 58'. Spout 67 is provided with a relatively long shank which terminates in the downturned bib 69. Sink 33 is provided with a drainpipe 70 which connects to the bottom thereof at the opposite end to the manifold pipe 62 and which projects outwardly through a side 28 of the cabinet 23, as best seen in Figure 4. The exposed end of pipe 53 is adapted to be connected to a suitable source of liquid supply as by means of a flexible hose or conduit, not shown, and the corresponding end of the drain 70 is adapted to be connected similarly to a drainpipe, not shown. It will thus be seen, that by opening the valve body 56, by turning handle 57 a liquid can be supplied to the sink 33 through the manifold pipe 62, or by turning the handle 57' liquid can be supplied through the bib 69. When it is desired to close the lid 35 handles 57 and 57', which are of corresponding construction, may be removed by lifting them upwardly to disengage them from the stems 57a which are provided with lugs 57b to engage the slots 57c, as illustrated in Figure 15. Spout 67 may then be pressed downwardly to lower the entire pipe system to the position, as seen in Figure 13 with the bib 69 resting in the recess 68. The pipes 48 by moving relatively to the members 45 form guides for the pipe system 50. Hose 60 is of sufficient length to allow the coupling member 59 to move from its raised position as seen in Figure 2 to its lowered position as seen in Figure 13 and the slot 54 accommodates the movement of the pipe 53. When the pipe system 50 has been moved to its lowered position the bib 69 is beneath the level of the flange 34 so that the lid 35 may be readily closed.

Mounted on the upper bar 45 is a plate 71 having the upturned apertured ends 72 for slidably mounting a rod 73. A coil spring 74 has one end bearing against the inner side of one of the ends 72 and its opposite end engaging the abutment member 75 which is secured to the rod 73 for normally holding the rod in a projected position with its forward end positioned to engage the socket 76 in one of the pipes 48, when the system 50 is in its raised position, as seen in Figure 2. A link 77 is connected to the opposite end of the rod 73 and to a lever 78, which is adapted to be actuated by means which will hereinafter be described, for retracting the rod 73 to permit the pipe system 50 to be lowered. It will thus be seen that rod 73 forms with the socket 76 a spring projected latch bolt and keeper for supporting the pipe system 50 in its raised position.

Referring particularly to Figures 6 and 10, a bar 79, formed of angle iron is secured at one end by means of the fastenings 80, which extend through the flange 81 of the bar 79, to the upper part of the front wall 26 of the cabinet 23 and at its opposite end to the bottom of the sink 33 by the fastenings 82. The vertical portion of the bar 79 is provided adjacent its ends with the pairs of spaced openings 83 to slidably mount the legs of the U-shaped members 84 and 85, as best seen in Figure 6, which extend outwardly therefrom through the sides 28. The legs of the U-shaped member 84 slidably engage the two outer openings 83 while the legs of the U-shaped member 85, are slidably mounted in the two inner openings 83. The legs of the members 84 and 85 are substantially equal to the width of the cabinet 23 and when in a fully retracted position, as seen in Figures 1 and 6 their intermediate portions 86 and 87, respectively, are disposed adjacent to the sides 28 to form handles for moving the cabinet 23 on its casters 30. The intermediate portions 86 and 87 are turned upwardly, as best seen in Figure 1. Members 84 and 85 may be drawn outwardly relatively to the cabinet 23 to their fully projected positions and are prevented from becoming disengaged from the bar 79 by the pins 88 which extend through the ends of the legs and which are adapted to engage opposite sides of the bar to limit the outward movement of the members 84 and 85 to the position, as seen in Figure 3. The legs of the members 84 and 85, adjacent the upturned intermediate portions 86 and 87, respectively, are provided with the notches 89 in their undersides which are adapted to engage the walls 28, when the members 84 and 85 are retracted, as seen in Figure 6, to hold the members in their retracted position until they are raised slightly and pulled outwardly, so that while in a retracted position they may be held rigidly to function as handles.

A plurality of brackets 90 are mounted on the inner sides of the walls 28 in spaced apart relationship one above the other and are provided at their outer ends with the V-shaped portions 91, forming rails, which extend from adjacent the back to adjacent the front of the cabinet 23, as seen in Figure 10. The brackets 90 are arranged at substantially the same levels on each of the side walls 28 so that the V-shaped portions 91 which are on the same level form pairs of rails for slidably mounting the trays 92 and the printing box 93. Trays 92 are each provided at one end with an outwardly projecting flange having spaced depending portions 94 which are adapted to slidably engage one of the rails 91 and at their opposite ends are provided with the outwardly and downwardly extending flanges 95 for slidably engaging the corresponding rail at the other side of the cabinet 23. The printing box 93 includes a top plate 96 which is likewise provided with the spaced flanged portions 94 and the flange 95 for mounting the box 93 on the two lower brackets 90.

The printing box 93 is mounted on the underside of one end of the plate 96 and is provided in its bottom with a plurality of sockets 97 which contain light bulbs 98. A horizontally disposed transparent panel 99 divides the upper and lower ends of the box 93 to allow light rays from the bulbs 98 to pass upwardly through the panel 99 and through an opening 100 in plate 96 into a printing frame, not shown. The box 93 is provided with a swinging door 101 hinged at 102 to provide access to the bottom part thereof for replacing the bulbs 98. A frame 103 depends from the opposite end of the plate 96 for slidably mounting a drawer 104, as seen in Figure 3.

As seen in Figure 5, the end portions of the flange 34 are provided with the spaced slots 105. Trays 92 and the printing box 93 can be removed from the cabinet 23 by opening its swinging doors 31 and sliding the trays and box outwardly on the rails 91. The trays and box are adapted to be mounted on the ends of the sink 33 by positioning the flanged portions 94 in the slots 105, as seen in Figure 9, and sliding the members 84 and 85 outwardly to their extended positions where they are adapted to engage the underside of the bottom of the trays 92 and the frame 103 for supporting these members on the end of the sink 33. The legs of the member 84 are sufficiently wide apart to permit the box 93 to extend downwardly therethrough, as seen in Figure 3. A tube 106 is journaled at one end in the brackets 107, which are secured to the inner side of one of the walls 28, adjacent the back of the cabinet 23, and the opposite end of the tube 106 is journaled in the front wall 26 and is provided with a handle or wheel 108 for turning the tube 106 to swing the angularly disposed ends of the rods 109, which are secured to the tube 106 into and out of engagement with the openings 110 of the flanged portions 94 for releasably securing the trays 92 and plate 96 to the end portions of the flange 34. A rod 111 extends through and is journaled in the tube 106 and has one end bent downwardly to form the lever 78 which is connected by the link 77 to the rod 73 for retracting the rod to enable the pipe system 50 to be moved from its raised to its lowered position. Rod 111 is provided at its opposite end with a hand wheel 112, disposed on the outer side of the wheel 108 for turning the rod 111 to rock the lever 78. Tube 106 is also provided with a collar 113 disposed behind the bracket 107 to prevent the tube from being accidentally pulled out of the cabinet 23.

As seen in Figure 7, a rod 114 is similarly mounted at the opposite side of the cabinet 23 and is provided with the locking members 109 which function in the same manner as those secured to the tube 106 for holding one of the trays or the printing box 93 in position on an end of the sink 33.

An outlet box 115 is mounted on one side of the cabinet 23 and is adapted to be connected by means of a removable conductor, not shown, to a source of electric current and is also adapted to be connected by the conductors 116, which are shown in fragment, to the sockets 97 and to the light fixtures 43 for illuminating the fixtures 43 and the bulbs 98. The cabinet 23 is provided in its front wall 26 with a pair of snap switches 117 which are connected with the conductors 116 which connect the outlet box 115 and the fixtures 43 for separately controlling the light fixtures 43, one of which is ruby and one orange. As best seen in Figures 3 and 14, a pair of snap switches 118 are mounted on the plate 96 and are connected with two circuits leading from the outlet box 115, one of which includes the conductor 116a which connects the four corner sockets 97 to the outlet box, and the other of which includes the conductor 116b which connects outlet box 115 with the center socket 97, to selectivity energize either the center ruby colored lamp 98 or the four white corner lamps 98. These connections are only made when plate 96 is mounted on an end of the sink 33, as seen in dotted lines in Figure 3.

From the foregoing it will be seen, that when the cabinet 23 is closed, as seen in Figure 1 and the connections to the pipes 53 and 70 are removed and likewise the connection to the outlet box 115, not shown, is removed, the cabinet 23 may be readily moved from one point to another by rolling it on its casters 30. To open the cabinet 23, lid 35 is first swung upwardly to its vertical position, as seen in Figure 3, after which the bars 40 are applied, as heretofore explained to rigidly hold the lid in its raised position. Handle 112 is then turned to retract the latch bar 73 and the bib 69 of the spout 68 is grasped and pulled upwardly to raise the pipe system 50, to its position as seen in Figure 2, after which the handle 112 is released to allow the spring 74 to project the bar 73 into position to engage the socket 76 for retaining the pipe system in a raised position. The valve stem handles 57 and 57' are then applied through the openings 58 and 58' and adjusted until they are positioned, as seen in Figure 15. The inlet pipe 53 and the outlet pipe 70 are then connected to their hose connections, not shown, as heretofore described and the outlet box 115 is connected by means of a flexible conductor, not shown, to a suitable source of electric current. The doors 31 are then opened to permit the two trays 92 to be applied to the ends of the sink 33, as heretofore explained, or if desired one tray 92 may be used at one end of the sink 33 and the printing box 93 connected to the opposite end of the sink and secured by the latch members 109.

To disassemble the cabinet for returning it to its folded position, the connections to the pipes 53 and 70 are removed and the bolt 73 is retracted by operating the handle 112 to allow the pipe system 50 to slide downwardly into the cabinet 23 after which the bars 40 are disconnected to permit the lid 35 to be closed with the light fixtures 43 nested in the sink 33. The trays 92 and printing box 93 are then removed from the ends of the sink 33 and replaced on the slide rails 91 after which the doors 31 can be closed. The connection to the outlet box 115 is next removed, and the U-shaped members 84 and 85 moved inwardly to their retracted position, as seen in Figure 1. The removable parts such as the bars 40 and the hose connections and flexible conductors, not shown, can be stored in the bottom of the cabinet 23 when not in use.

Various modifications and changes in the precise construction and arrangement of the parts forming the invention are contemplated and may be resorted to and the right is reserved to make such variations and changes as do not depart from the spirit and scope of the invention as hereinafter defined by the appended claims.

I claim as my invention:

1. A device of the class described comprising a cabinet, a tray, a printing box, tracks attached to the sides of said cabinet, flanges on the ends of the tray and printing box for slidably and removably engaging the tracks, a sink mounted in the top of said cabinet, and means on the ends of said sink for receiving the flanges to removably mount the tray and printing box on the ends of the sink.

2. A device as in claim 1, certain of said flanges being provided with openings, and locking means mounted in said cabinet for engaging said openings for releasably retaining the tray and printing box in engagement with the sink.

3. A device as in claim 1, comprising supporting members slidably mounted in the cabinet and movable to an extended position for engaging said tray and printing box adjacent their free ends, when connected to the sink.

4. A device as in claim 1, comprising a lid pivotally connected adjacent the back of the cabinet for covering the sink when in a closed position, means for retaining the said lid in a raised position, and a conduit system slidably mounted in the back of said cabinet and adapted to be detachably connected to a source of liquid supply for supplying liquid to the sink.

5. A cabinet of the class described having a storage compartment provided with opposed inwardly projecting members having V-shaped portions forming rails, a tray having a depending flange at one end and a plurality of spaced depending flanges at its opposite end for slidably and removably engaging the rails, a receptacle mounted in the top of the cabinet having a flange at one end provided with spaced slots for receiving the spaced flanges of said last mentioned end of the tray for detachably connecting the tray and receptacle, a U-shaped supporting member slidably mounted in a side of said cabinet and having an upturned intermediate portion forming a handle, when in a retracted position, and said upturned intermediate portion forming a support for the free end of said tray when said member is in an extended position.

6. A cabinet of the class described having a storage compartment provided with opposed inwardly projecting members having V-shaped portions forming rails, a tray having a depending flange at one end and a plurality of spaced depending flanges at its opposite ends for slidably and removably engaging the rails, a receptacle mounted in the top of the cabinet having a flange at one end provided with spaced slots for receiving the spaced flanges of said last mentioned end of the tray for detachably connecting the tray and receptacle, a lid pivotally connected to the cabinet and forming a cover for the receptacle, a conduit system adapted to be detachably connected to a source of liquid supply, said conduit system being slidably mounted in said cabinet, a portion of said system being disposed above the receptacle when in a raised position for supplying a liquid thereto, and said portion being retractible for closing said lid.

7. A photographer's work cabinet provided with a sink in the top thereof, a lid pivotally connected to the back of said cabinet for covering the sink, when in a closed position, a liquid conduit system disposed in the back of said cabinet and including a pipe projecting outwardly through the side thereof, said side being provided with a longitudinal slot to receive said pipe, said system including a plurality of branch pipes, one of said branch pipes being connected to a spout, a manifold pipe mounted in one end and adjacent the bottom of said sink and connected to another of said branch pipes, valves for controlling the flow of liquid through said branch pipes, guide means depending from said conduit system and slidably mounted in said cabinet for slidably mounting the system relatively thereto, said system being adapted to be raised and lowered, and locking means for retaining the system in a raised position.

8. A device as in claim 7, comprising means formed in the ends of said sink and adapted to engage corresponding ends of trays for mounting the trays at the ends of the sink, and retractible supporting means slidably mounted in said cabinet and adapted to engage the free ends of said trays, when in an extended position.

9. A device as in claim 7, said locking means including a slidably mounted bolt, a socket formed in said guide means, an expansion spring for normally projecting the bolt into a position to engage the socket when the conduit system is in a raised position, a rod rotatably mounted in said cabinet and having one end projecting outwardly thereof and provided with a handle, the opposite end of said rod being bent downwardly to form a lever, and a link connecting said lever and bolt for retracting it.

10. A device as in claim 7, comprising a pair of swinging doors forming a part of the front panel of said cabinet, rails mounted within said cabinet and adapted to slidably and removably mount the trays for storage when the cabinet is in a closed position.

11. A portable photographer's cabinet comprising a cabinet provided with a front wall having swinging closures, a plurality of trays, a printing box, means mounted in said cabinet behind the closures for slidably and removably mounting the trays and printing box therein, a lid pivotally mounted on the top of said cabinet, a sink disposed in the top of said cabinet beneath said lid, means for detachably connecting said trays and printing box to the ends of said sink, when the lid is in an open position, a pipe system slidably mounted in the back of said cabinet, said system being movable to a raised position with a portion thereof above the sink, when said lid is in an open position, and a pipe projecting outwardly of said cabinet and forming a part of said system, said pipe being adapted to be connected to a source of liquid supply for supplying liquid through a plurality of outlets, selectively, to the sink.

12. A device as in claim 11, comprising a flange forming a part of said lid and provided with a plurality of openings, bars removably connected to said cabinet and provided with lugs for engaging said openings for retaining the lid in a raised position.

13. A photographer's cabinet comprising a cabinet, brackets mounted within said cabinet and provided with V-shaped portions forming rails, a plurality of trays, a plate, said trays and plate each being provided with a flange at one end having spaced depending tongues, a flange at the opposite end of each of said trays and plate having a downturned free end, said tongues and downturned free ends being adapted to slidably and removably engage the V-shaped portions of said rails for removably mounting the trays and plate therein for storage, a printing box secured to and depending from the plate, adjacent one end thereof, a sink mounted in the top of said cabinet and having flanged end portions provided with slots to receive said tongues for mounting the trays and plate on the ends of the sink, and locking means mounted in said cabinet for releasably engaging said tongues for releasably connecting them to the sink.

14. A photographer's work cabinet comprising a storage compartment, a tray slidably and removably mounted therein, a sink above said storage compartment, means for detachably securing the tray to an end of the sink, a pivoted closure for said sink, and a conduit system slidably mounted in the storage compartment and provided with fittings for the sink, said fittings including a faucet having a bib normally disposed above the sink, said conduit system being adapted to be connected to a source of liquid supply and being retractible for moving the faucet downwardly relatively to the sink and for moving its bib into the sink to permit the closure to be swung to a closed position over the sink.

15. A device of the class described comprising a portable cabinet, a sink mounted therein, a closure for the sink, and a liquid conduit system slidably mounted in the cabinet and adapted to be detachably connected to a source of liquid supply for supplying a liquid to the sink, said liquid conduit system including sink fittings, said sink fittings including a faucet having a bib normally disposed above the sink, and said faucet being movable relatively to the sink when the liquid conduit system is retracted for moving the bib into the sink to permit said closure to be swung to a closed position over the sink.

LEON L. OGG.